(12) United States Patent
Weber et al.

(10) Patent No.: US 6,872,820 B2
(45) Date of Patent: Mar. 29, 2005

(54) FINELY DIVIDED POLYSACCHARIDE DERIVATIVES

(75) Inventors: Gunter Weber, Fallingbostel (DE); Detmar Redeker, Walsrode (DE); Bernd Klinksiek, Gladbach (DE); Jürgen Hinderer, Leverkusen (DE); Benno Ulfik, Leverkusen (DE)

(73) Assignee: Wolff Walsrode AG, Walsrode (DE)

( * ) Notice: Subject to any disclaimer, the term of this patent is extended or adjusted under 35 U.S.C. 154(b) by 0 days.

(21) Appl. No.: 09/968,497

(22) Filed: Oct. 1, 2001

(65) Prior Publication Data

US 2002/0111480 A1 Aug. 15, 2002

Related U.S. Application Data

(63) Continuation-in-part of application No. 09/341,412, filed as application No. PCT/EP98/00080 on Jan. 8, 1998, now Pat. No. 6,320,043.

(30) Foreign Application Priority Data

Jan. 21, 1997 (DE) .......................... 197 01 876
Dec. 5, 1997 (DE) .......................... 197 54 064

(51) Int. Cl.$^7$ .......................... C08B 11/00; C08B 11/20
(52) U.S. Cl. .......................... 536/84; 536/114; 536/45; 536/52; 536/102; 536/107; 536/112; 536/115; 536/120; 536/121; 536/17.9; 536/20; 536/43; 536/50; 536/90; 166/300; 424/70.1; 424/70.12; 424/70.13; 162/164.1; 162/175; 162/172; 510/224
(58) Field of Search .............................. 536/84, 114, 45, 536/52, 102, 107, 112, 115, 120, 121, 17.9, 20, 43, 50, 90, 91, 95, 96, 99, 100; 166/300; 424/70.1, 70.12, 7.13; 162/164.1, 175, 172; 510/224

(56) References Cited

U.S. PATENT DOCUMENTS

| | | | |
|---|---|---|---|
| 4,076,935 A | 2/1978 | Eichenseer et al. | ........... 536/86 |
| 4,415,124 A | * 11/1983 | Carduck et al. | ............... 241/28 |
| 4,650,716 A | 3/1987 | Gelman | ...................... 428/402 |
| 4,689,408 A | 8/1987 | Gelman et al. | ............... 536/98 |
| 4,820,813 A | 4/1989 | Schulz | ........................ 536/84 |
| 4,979,681 A | * 12/1990 | Donges et al. | ................. 241/17 |
| 5,981,737 A | * 11/1999 | Manuszak-Guerrini et al. | ........................... 536/44 |
| 6,320,043 B1 | * 11/2001 | Weber et al. | .................. 536/84 |

FOREIGN PATENT DOCUMENTS

| | | |
|---|---|---|
| DE | 287 556 | 9/1915 |
| DE | 952 264 | 11/1956 |
| DE | 24 58 998 | 5/1976 |
| DE | 30 32 778 | 4/1982 |
| DE | 17 93 472 | 1/1990 |
| GB | 2262527 | 6/1993 |
| JP | 54-74855 | * 1/1979 |
| JP | 54-74855 | 6/1979 |
| WO | 96/00748 | 1/1996 |

* cited by examiner

*Primary Examiner*—James O. Wilson
*Assistant Examiner*—Devesh Khare
(74) *Attorney, Agent, or Firm*—Joseph C. Gil; Godfried R. Akorli; James R. Franks

(57) ABSTRACT

Finely divided polysacharide derivatives are described. The finely divided polysacharide derivatives are prepared by a process comprising: a) forming an aqueous composition comprising a polysaccharide derivative and water, in which the polysaccharide derivative is soaked or dissolved; b) converting the polysaccharide derivative of the aqueous composition into finely divided solid particles by, (i) contacting the aqueous composition with superheated water vapor in a dryer-pulverizer; or (ii) causing the polysaccharide derivative of the aqueous composition to flocculate; and c) optionally drying the finely divided solid particles of step b). The primary structures of the polysaccharide starting material are largely removed, and the product has a shape factor of less than 5 and greater than or equal to 1.

4 Claims, No Drawings

FINELY DIVIDED POLYSACCHARIDE DERIVATIVES

CROSS REFERENCE TO RELATED APPLICATIONS

The present patent application is a continuation-in-part of and claims the right of priority under 35 U.S.C. §120 of U.S. patent application Ser. No. 09/341,412, filed Jul. 8, 1999, which is now U.S. Pat. No. 6,320,043 which claims the right of priority under 35 U.S.C. §119 and 35 U.S.C. §365 as a 371 of International Application No. PCT/EP98/00080, filed 8 Jan. 1998, which was published in German as International Patent Publication No. WO 98/31710 on 23 Jul. 1998, which is entitled to the right of priority of German Patent Application No's. 197 01 876.9, filed 21 Jan. 1997, and 197 54 064.3, filed 5 Dec. 1997.

FIELD OF THE INVENTION

The invention relates to polysaccharide derivatives, in particular cellulose derivatives, having a thermal flocculation point, that are prepared by a new, particularly economic process.

BACKGROUND OF THE INVENTION

After the reaction and, if applicable, after the purification of secondary products formed during the reaction, polysaccharide derivatives are in a form which may be friable or lumpy or may resemble cotton wool. In this form, the polysaccharide derivatives still retain the structures determined by the raw materials. Thus, for example, cellulose ethers still exhibit the fibrous structure of the initial cellulose. These polysaccharide derivatives are thus unsuitable for use, for example, as products soluble in organic and/or aqueous media.

It is also necessary to establish specific particle-size distributions, bulk densities, degrees of drying and degrees of viscosity for the various fields of application.

In principle, virtually all polysaccharide derivatives have therefore to be compacted, ground and dried in order to be made suitable for use.

The cellulose derivatives rank among the industrially important polysaccharide derivatives. Their preparation, properties and applications are described, for example, in: Ullmann's Encyclopedia of Industrial Chemistry, 5th Edition, (1986), Volume A5, pages 461-488, VCH Verlagsgesellschaft, Weinheim, Methoden der organischen Chemie, 4th Edition (1987), Volume E20, Makromolekulare Stoffe, Part Volume 3, pages 2048–2076, Georg Thieme Verlag, Stuttgart.

DE-C 952 264 discloses a three-step process for converting moist, fibrous methyl celluloses into powder having a high rate of dissolution. Here the product, which contains 50 to 70 wt. % water, is first of all homogenised to form a plastic composition and cooled to 10° C. to 20° C., for which purpose a cooled screw press is used; the product is then ground using a hammer mill and dried in a forced-air dryer.

EP-A 0 049 815 (equivalent to U.S. Pat. No. 4,415,124) describes a two-step process for preparing micropowders from cellulose ethers or cellulose, wherein the products, which have a finely fibrous or woolly structure, are first of all converted into a brittle, compacted form and the material thus treated is subjected to a grinding process until a particle-size distribution of at least 90% under 0.125 mm. is attained. Oscillating mills or ball mills, preferably in cooled form, or pellet mills are used in the embrittling step and jet mills, pin mills or impact disk mills are used in the grinding step.

DE-A 30 32 778 mentions a two-step process for the continuous homogenisation of moist cellulose ethers by subjecting the moist cellulose ether to a cutting, impacting or shearing action, produced by circulating rotary bodies having casings with different profiles, at the same time optionally pelletising the comminuted cellulose ethers with addition of water, and subsequently drying the pellets obtained.

EP-B 0 370 447 describes a process for the non-destructive grinding and simultaneous drying of moist cellulose ethers, wherein a cellulose ether having an initial moisture content of 20 to 70 wt. % is conveyed by means of a transport gas and simultaneously comminuted by impact and friction and, by means of the energy of grinding, is dried to a residual moisture content of 1 to 10 wt. %.

EP-B 0 384 046 describes a process for preparing cellulose ether particles which involves the comminution of cellulose ethers having a viscosity of greater than 100 Pa·s—determined as 2% aqueous solution at 20° C., using an Ubbelodhe tube—to a particle size of 0.4 to 0.035 mm in a high-speed air-swept rotary impact mill.

JP-A 79 74855 describes a process for the preparation of pulverulent, soluble cellulose derivatives.

WO 96/0074 (equivalent to EP 0 767 811) mentions a process for comminuting cellulose ethers which involves the extrusion of a hydrated cellulose ether through orifices having a cross-sectional area of from 0.0075 mm$^2$ to 1 mm$^2$ (7.5×10$^{-9}$ m$^2$ to 1×10$^{-6}$ m$^2$) and cutting up the extrudate thus produced to the desired length.

EP-B 0 201 895 describes a process for preparing largely non-fibrous CMC material, characterised by treating the fibrous CMC with water and recovering the non-fibrous CMC through the addition of a liquid which does not dissolve the CMC. The known prior art processes are mostly multistep with a predryer or preliminary embrittlement or preliminary compaction. Furthermore, in all processes the chemical and/or thermal action on the macromolecules, particularly during the processing of highly viscous, highly substituted products, is invariably so high that during the grinding process the macromolecules are broken down in the sense that their chains are reduced in length, which is manifested in particular by a more or less extensive breakdown of the viscosity compared with that of the products initially used. Moreover, the surfaces of the products treated by means of preliminary embrittlement or preliminary drying steps become keratinised. In addition, common to all processes is the high expenditure of energy for grinding the polysaccharide derivatives after preliminary drying, preliminary embrittlement or preliminary compaction.

SUMMARY OF THE INVENTION

Accordingly, an object of the present invention is to provide finely divided polysaccharide derivatives prepared by a process, wherein specific degrees of grinding can be established no keratinisation of the products occurs the bulk density of the products is increased no, or only minimal, unwanted breakdown of the viscosity compared with that of the starting products takes place a free-flowing product is obtained the proportion of fine dust in the product is low the amount of energy which has to be expended for the compaction, drying and grinding is decreased and the energy which of necessity has to be introduced can be partially recovered and subsequently reused.

In accordance with the present invention, there is provided a finely divided polysaccharide derivative product prepared by a process comprising:

a) forming an aqueous composition comprising a polysaccharide derivative and water, said composition containing water in an amount of 35 to 99 wt. %, based on the total weight of said aqueous composition, said polysaccharide derivative being soaked or dissolved in said composition;

b) converting the polysaccharide derivative of said aqueous composition into finely divided solid particles by,
  (i) contacting said aqueous composition with superheated water vapor in a dryer-pulverizer, thereby converting the water of said aqueous composition into the vapor phase, and converting the polysaccharide derivative of said aqueous composition into finely divided solid particles; or
  (ii) causing the polysaccharide derivative of said aqueous composition to flocculate, thereby converting the polysaccharide derivative of said aqueous composition into finely divided solid particles; and c) optionally drying the finely divided solid particles of step b), wherein the primary structures which result from the polysaccharide starting material have been largely removed, and the product has a shape factor of less than 5 and greater than or equal to 1.

Other than in the operating examples, or where otherwise indicated, all numbers expressing quantities of ingredients, reaction conditions, etc. used in the specification and claims are to be understood as modified in all instance by the term "about."

DETAILED DESCRIPTION OF THE INVENTION

Surprisingly, it was found that the polysaccharide derivatives prepared by this process have a high bulk density accompanied by good flow properties. The particles thus produced have a shape factor of less than 5 and greater than/equal to 1, the majority (>50 wt. %) having a shape factor* of less than/equal to 2 and the proportion of fine dust in the product being low. There is no, or only minimal, unwanted breakdown of the viscosity compared with that of the starting products. In addition, it was found that the total energy requirements of the steam-mill drying are decreased compared with the prior art processes and, since the heat-transfer gas consists of superheated vapour of a solvent or mixed solvent, the energy introduced for the grinding and converted into heat energy is recovered in the heat-transfer gas and can therefore be utilised or advantageously converted into other forms of energy.

As used herein and in the claims, the term "shape factor" means the ratio of the largest diameter to the smallest diameter of an (ideally ellipsoidal) body.

The invention relates to a new, particularly economic process for preparing pulverulent polysaccharide derivatives, in particular cellulose derivatives, having a thermal flocculation point; the process comprises soaking or dissolving the polysaccharide derivative in a solvent or mixed solvent, dividing/comminuting the soaked or dissolved polysaccharide derivative by thermal and/or mechanical liquid separation and an optional drying step.

The polysaccharide derivatives used in this process are soluble or at least soakable in solvents or mixed solvents. They can have one or more substituents of the types: hydroxyethyl, hydroxypropyl, hydroxybutyl, methyl, ethyl, propyl, dihydroxypropyl, carboxymethyl, sulfoethyl, hydrophobic long-chain branched and unbranched alkyl groups, hydrophobic long-chain branched and unbranched alkylaryl groups or aryl alkyl groups, cationic groups, acetate, propionate, butyrate, lactate, nitrate, sulfate, of which some groups, such as, for example, hydroxyethyl, hydroxypropyl, hydroxybutyl, dihydroxypropyl, lactate, are capable of forming grafts and the substituents of the polysaccharides according to the invention are not limited to these groups. Typical polysaccharide derivatives are guar derivatives, starch derivatives, chitin or chitosan derivatives, preferably cellulose derivatives, but the polysaccharide derivatives according to the invention are not limited to these.

Examples of cellulose derivatives are hydroxyethyl cellulose (HEC), hydroxypropyl cellulose (HPC), ethyl hydroxyethyl cellulose (EHEC), carboxymethyl hydroxyethyl cellulose (CMHEC), hydroxypropyl hydroxyethyl cellulose (HPHEC), methyl cellulose (MC), methyl hydroxypropyl cellulose (MHPC), methyl hydroxyethyl cellulose (MHEC), carboxymethyl cellulose (CMC), hydrophobically modified hydroxyethyl cellulose (hmHEC), hydrophobically modified hydroxypropyl cellulose (hmHPC), hydrophobically modified ethyl hydroxyethyl cellulose (hmEHEC), hydrophobically modified carboxymethyl hydroxyethyl cellulose (hmCMHEC), hydrophobically modified hydroxypropyl hydroxyethyl cellulose (hmHPHEC), hydrophobically modified methyl cellulose (hmMC), hydrophobically modified methyl hydroxypropyl cellulose (hmMHPC), hydrophobically modified methyl hydroxyethyl cellulose (hmMHEQ, hydrophobically modified carboxymethyl methyl cellulose (hmCMMC), sulfoethyl cellulose (SEC), hydroxyethyl sulfoethyl cellulose (HESEQ, hydroxypropyl sulfoethyl cellulose (HPSEC), methyl hydroxy ethyl sulfoethylcellulose (MHESEQ), methyl hydroxypropyl sulfoethyl cellulose (MHPSEC), hydroxyethyl hydroxypropyl sulfoethyl cellulose (HEHPSEC), carboxymethyl sulfoethyl cellulose (CMSEQ), hydrophobically modified sulfoethyl cellulose (hmSEQ, hydrophobically modified hydroxyethyl sulfoethyl cellulose (hmHESEC), hydrophobically modified hydroxypropyl sulfoethyl cellulose (hmHPSEC), hydrophobically modified hydroxyethyl hydroxypropyl sulfoethyl cellulose (hmHEHPSEC).

Particularly preferred cellulose derivatives are cellulose ethers having a thermal flocculation point in water, such as, for example, methyl cellulose, methyl hydroxyethyl cellulose, methyl hydroxypropyl cellulose and hydroxypropyl cellulose.

Suitable solvents for the soaking or dissolving are solvents whose molecules have polar groups which preferably contain the hetero atoms nitrogen, sulfur and oxygen. However, hydrocarbons and halogenated hydrocarbons may also be used. Preferred solvents are water, alcohols such as methanol, ethanol, isopropanol and esters such as ethyl acetate and butyl acetate. The particularly preferred solvent is water. The use of mixed solvents is in accordance with the invention.

Primary structures which result from the polysaccharide starting material are removed by the soaking or dissolving process. Thus in cellulose ethers, for example, the fibrous structure is almost completely lost; here, of course, only the portion of the polysaccharide derivative in which derivatisation is adequate will be soaked or dissolved. The soaked or dissolved polysaccharide derivatives thus obtained contain less than 25 to 50 wt. %, based on the solids content, of soluble or soakable material in the initial condition, in cellulose derivatives in the fibrous condition, preferably less than 10 wt. %, particularly preferably less than 5 wt. % and most preferably less than 1 wt. %.

The process also includes soaking and/or dissolving processes which are carried out by addition of a substance which dissolves the polysaccharide to one which does not, or by converting a substance which does not dissolve the polysaccharide derivative into one which does so, for example, by changing the temperature. The resulting soaked or dissolved polysaccharide derivatives, depending on the quantity of solvent and on the polysaccharide derivative, range from liquids which flow freely without the use of pressure to rigid compositions which are incapable of flowing even under pressure.

The proportion of solvent or mixed solvent is so chosen that a degree of soaking or dissolving which is sufficient to remove the primary structures is achieved. In a preferred procedure, this is 35 to 99 wt. %, particularly preferably 60 to 80 wt. %., solvent or mixed solvent, based on the total weight.

In one embodiment of the process, polysaccharide derivatives having a thermal flocculation point, preferably cellulose ethers having a thermal flocculation point in water, particularly preferably methyl cellulose, methyl hydroxyethyl cellulose, methyl hydroxypropyl cellulose, hydroxypropyl cellulose—through the cooling of a solvent-moistened, preferably water-moistened filter cake, optionally with the aid of additional solvent, preferably water—in a soaked condition or in solution are brought to temperatures below the flocculation point, so that primary structures, for example, fibrous structures, are largely lost.

The soaked or dissolved polysaccharide derivative is then converted into the solid state in a dryer-pulveriser in such a way that, synergistically, on the one hand the solvent or mixed solvent contained in the soaked or dissolved polysaccharide derivative is converted into the vapour phase by means of the superheated vapour of the corresponding, or of a different, solvent or mixed solvent, and on the other hand, the dissolved or soaked polysaccharide derivative is converted into the solid by phase transition, the change in form of the polysaccharide derivatives in these processes taking place as a result of the superimposition of external forces (steam mill drying).

The introduction of the polysaccharide derivative into the dryer-pulveriser can, depending upon the consistency of the material to be introduced, be carried out by means of prior art feed devices. A preliminary breaking up of the strand to be introduced into individual strands, which optionally may be further cut up in the transverse direction, is in accordance with the invention, the individual strands having cross-sectional areas of greater than 1 mm$^2$. The extruded strands can be fed directly into the pulverising zone by means of screw conveyors. More advantageously, the charged material is pressed through a passing screen and thus shaped into individual strands. These can be conveyed pneumatically into the dryer-pulveriser. In a similar way, single-shaft or twin-shaft screw-type machines having a perforated disk attachment can be used. After the perforated disk, the continuous strands may optionally be cut into smaller sections by means of a cutting tool.

In one variant of the process, the steam mill drying is carried out in a gas- or air-swept mill, wherein the polysaccharide derivative is subjected to an impacting and/or shearing stress. Suitable mills are, for example, hammer mills, screen-type mills, pin mills, disk mills, jet mills, preferably classifier mills. Superheated vapour of a solvent or of a mixed solvent (superheated steam) is used as heat-transfer gas and transport gas for the steam mill drying and here the solvent or mixed solvent used can correspond to or differ from the solvent or mixed solvent contained in the soaked or dissolved polysaccharide derivative. Preferably superheated steam is used. The dissolved or soaked polysaccharide derivative is comminuted by repeated impacting and/or shearing stress between rotating and fixed or contrarotating; grinding devices and/or by impact of several particles. At the same time, the solvent or mixed solvent contained in the solid matter is vaporised. The thermal energy required for this is only partly introduced by means of superheated vapour of a solvent or mixed solvent. The electrical energy of the mill drive, converted by friction into heat, simultaneously contributes to the drying process. The finely divided solid particles are separated from the flow of gas in a separator arranged in tandem with the dryer-pulveriser. The separator can be a centrifugal separator such as, for example, a cyclone, or a filtering separator. Depending on the construction of the mill, an air classification may already take place internally. Grit content which may possibly be present is separated from the fine material because the centrifugal force predominates over the pulling forces of the transport gas. The fine material is discharged from the pulverising chamber as finished product together with the transport gas. The grit is returned to the pulverising zone in an internal or external recycling system. Alternatively or additionally, it may be useful to arrange in tandem another classifying step, by air or preferably by screening. The coarse fraction separated there may optionally be returned to the mill or be mixed with the feed material.

In a preferred embodiment of the process, the superheated steam is recirculated and the excess superheated steam is transferred out as a subsidiary stream of vapour. A heat exchanger, which reheats; the vapour produced by the vaporisation of the solvent or mixed solvent contained in the polysaccharide derivative and cooled by heat loss, is arranged in front of the dryer-pulveriser. The temperature of the vapour of a solvent or mixed solvent required for the steam mill drying is chosen so that, depending on the chosen product throughput and/or the quantity of solvent or mixed solvent in the polysaccharide derivative, at no point does it fall below the dew point.

The use of solvents or mixed solvents in the steam mill drying results in the attainment within the dryer-pulveriser of an atmosphere which is low in oxygen.

The stream of vapour or discharged subsidiary stream of vapour, optionally after a hot gas filtration, can be recondensed with the recovery of heat.

In another variant of the process according to the invention, the solution of a cellulose ether having a thermal flocculation point is dispersed in a hot ambient medium, preferably water, above the flocculation point, with the consequent production of discrete particles, which can be processed into pulverulent solid particles in subsequent comminuting, filtration and drying steps. The required final particle sizes are established in the suspension by means of a dividing/comminuting system and by the dispersion process. The product is recovered by separating off the suspending liquid, the separation being effected by a direct thermal drying or by a combination of mechanical separation of the liquid and thermal drying.

In another variant of the process according to the invention, a solution of a cellulose ether having a thermal flocculation point is dispersed in a hot ambient medium, preferably water, above the flocculation point. This solution is dispersed in the form of droplets in a concentrated salt solution at temperatures above the flocculation point and precipitated. Owing to the high salt concentration in the ambient medium, the droplets containing cellulose ether become concentrated as a result of osmosis. After several filtration and washing steps at temperatures above the flocculation point, a cellulose ether low in salt is obtained. After dispersion in a hot ambient medium, preferably water, above the flocculation point, the required final particle size is established by means of a dividing/comminuting system. The product is recovered by separating off the suspending liquid, the separation being effected by a direct thermal drying or by a combination of mechanical separation of the liquid and thermal drying.

The finely divided solid particles may optionally be dried to the required moisture content in prior art drying devices and optionally be subjected beforehand or afterwards to a classification by screening and/or by air. Drying is suitably carried out using convection dryers, preferably using pneumatic dryers, ring dryers or similar units.

To modify the properties of the end product, modifiers, additives and/or active ingredients may optionally be added before, during or after one or more of the steps in the process—soaking or dissolving the solution of the polysaccharide derivative in a solvent or mixed solvent, division/comminution of the soaked or dissolved polysaccharide derivative and thermal and/or mechanical separation of the liquid, drying of the finely divided polysaccharide derivative.

By modifiers are meant substances which have a chemical effect on the polysaccharide derivative. Typical modifiers are oxidising agents, for example, hydrogen peroxide, ozone, hypohalites, perborates and percarbonates, as well as cross-linking agents, for example, dialdehydes such as glyoxal or glutaric dialdehyde, polyfunctional epoxides, polyfunctional isocyanates, organic acids, mineral acids, organic and inorganic salts, but are not limited to these.

By additives are meant substances which have no chemical effect on the polysaccharide derivative. Typical additives are preservatives, dispersing agents, defoaming agents, air-entraining agents, pigments, non-ionic, anionic and cationic synthetic and natural polymers, organic and inorganic salts, but are not limited to these.

By active ingredients are meant substances which have no chemical effect on the polysaccharide derivative as a binder. Typical active ingredients are agricultural pesticides and pharmaceuticals, but are not limited to these.

The polysaccharide derivatives in this invention can be used in a large number of applications. They are used as thickeners, which may be soluble in water or in other solvents, for adhesives, dyes, building materials, cosmetics, foods. They can be used as coatings or as binders, for example, in pharmaceuticals. A further application is as protective colloid, for example, in suspension polymerisation.

The products of this process are finely divided polysaccharide derivatives wherein the primary structures, for example, fibrous structures, originating from the starting materials have been largely removed. The individual solid particles have a shape factor* of less than 5 and greater than/equal to 1, the majority (>50 wt. %) having a shape factor* of less than/equal to 2. 100 wt. % of the finely divided solid particles can pass through a 1 mm screen, preferably 100 wt. % can pass through a 0.315 mm screen, particularly preferably more than 95 wt. % can pass through a 0.16 mm screen, most preferably more than 95 wt. % can pass through a 0.1 mm screen and less than 10 wt. % of the product can pass through a 0.1 mm screen and more than 10 wt. % of the product is retained on a 0.03 mm screen. The proportion of agglomerated particles is low compared with the products of prior art. The product has good flow properties and high bulk densities, in the case of cellulose ethers, bulk densities of greater than/equal to 0.3 kg/l, preferably greater than/equal to 0.4 kg/l. The dispersion and soaking performance of the products in solvents or mixed solvents is dependent on the conditions of the process according to the invention; it can be increased to above that of prior art products and decreased to below that of prior art products.

EXAMPLES OF THE SOAKING AND DISSOLVING OF MC

Methyl hydroxyethyl cellulose filter cake (consisting of methyl hydroxyethyl cellulose having a methoxy group content of 19.9 to 30.5 per cent and a hydroxyethoxy group content of 3.1 to 14.8 per cent), solids content of 50 wt. %, based on the total weight, at 95° C. was adjusted to a solids content of 20 to 30 wt. %, based on the total weight, with continual stirring in a stirrer vessel of water, the temperature of which was likewise 95° C. The suspension thus obtained was cooled to 45°. An aqueous methyl hydroxyethyl cellulose gel (referred to below as gelled or as paste) was thereby produced, Alternatively, the separation of the methyl hydroxyethyl cellulose from the washing liquid after washing with hot water was carried out in such a way that filter cakes having a solids content of 30 to 50 wt. %, based on the total weight, were obtained directly. The soaking or dissolving of the methyl hydroxyethyl cellulose was achieved by cooling to 25° C.

The methyl hydroxyethyl cellulose gels thus produced were converted into finely divided solids (Examples 1 to 3).

Example 1

Methyl hydroxyethyl cellulose paste (consisting of methyl hydroxyethyl cellulose having a methoxy group content of 19.9 to 27.1 per cent and a hydroxyethoxy group content of 3.1 to 9.9 per cent and a viscosity in 2% aqueous solution of 15,000 mpa·s at 20° C. and 2.55 I/s (Haake Rotovisko)) was introduced, at temperatures above the flocculation point, into a heated double-jacketed stirrer vessel (50 l) containing water. The gelled methyl hydroxyethyl cellulose was dispersed and comminuted by means of a rotor-stator system (Cavimix 1032, from the firm Cavitron). The suspension thus produced was passed into a heated closed circular system by means of a heated gear pump (approx. 100 I/h). Another heated gear pump rendered possible the regulated withdrawal of a subsidiary stream (1–5 I/h) from this closed circular system. This subsidiary stream was atomised in a spray tower (diameter 1 m) by means of a two-fluid nozzle. At the inlet, the air for drying was preheated to 200° C.; at the outlet the temperature was approx. 120° C.

The solid matter was deposited by means of a combined cyclone and filter. A dry, free-flowing powder was obtained, of which more than 98 wt. %, based on the total weight, passed through a 0.1 mm screen and more than 91 wt. % passed through a 0.063 mm screen.

Example 2

A 2% methyl hydroxyethyl cellulose solution (consisting of methyl hydroxyethyl cellulose having a methoxy group content of 24.2 to 30.5 percent and a hydroxyethoxy group content of 7.5 to 14.8 percent and a viscosity in 2% aqueous solution of 20,000 mPa·s at 20° C. and 2.55 I/s (Haake Rotovisko)) was prepared at approx. 60° C. in a heated double-jacketed stirrer vessel. The methyl hydroxyethyl cellulose solution was added dropwise through a nozzle (diameter 0.7 mm) into a 16% NaCl solution at temperatures above the flocculation point (95° C.). Particle sizes of approx. 2 mm were obtained. Owing to the osmotic effect, the particles contained only approx. 20% methyl cellulose. The suspension was filtered off in a pressure nutsche at temperatures above the flocculation point. The filter cake was washed with wash water at a temperature of 95° C., then made into a slurry by means of a slow stirrer, again filtered off and washed and, after four further washing/filtering cycles, finally dehumidified by filtration under suction. After redilution with water at above the flocculation point to a methyl hydroxyethyl cellulose content of approx. 10%, the sample was comminuted in a heated receiver by means of a rotor-stator system, for example, Kotthoff-Mischsirene. The solution was atomised in a spray tower (diameter 1 m) by means of a two-fluid nozzle. At the inlet, the air for drying was preheated to 200° C.; at the outlet the temperature was approx. 120° C. The solid matter was deposited by means of combined cyclone and filter. A dry, free-flowing powder having a salt content of less than 1% and a bulk density of approx. 340 g/l was obtained, of which more than 76 wt. %, based on the total weight, passed through a 0.1 mm screen and more than 60 wt. % passed through a 0.063 mm screen.

Example 3

The pulverizing equipment consisted of an air-swept mill with vertically arranged drive shaft and four grinding surfaces of 0.51 m in diameter, each having 16 impacting plates, which operated against a profiled opposing grinding surface. The peripheral speed of the rotor was 78 m/s. A cyclone of 0.8 m in diameter, where the major part of the finely ground product was deposited, was arranged in tandem with the mill. After the cyclone, a blower forced the grinding gas back into the mill via a heat exchanger. The excess vapour component was transferred out and deposited in a Venturi washer.

An aqueous methyl hydroxyethyl cellulose paste (consisting of methyl hydroxyethyl cellulose having a methoxy group content of 24.2 to 27.1 per cent and a hydroxyethoxy group content of 7.5 to 11.8 per cent and a viscosity in 2% aqueous solution of 12,000 mPa·s at 20° C. and 2.55 l/s (Haake Rotovisko)) with a solids content of 20%, based on the total weight, was passed to the pulverising chamber at a throughput of 50 kg per hour by the procedure described above. On entering, the superheated steam was at a temperature of 180° C. to 200° C. at normal pressure. At the outlet of the pulverising chamber, the temperature of the steam was 120° C. to 140° C. The quantity of gas circulated was 2500 operating cubic meters, as measured in air at room temperature.

A free-flowing methyl hydroxyethyl cellulose was obtained, of which more than 85 wt. %, based on the total weight, passed through a 0.1 mm screen and more than 57 wt. % passed through a 0.063 mm screen.

The particle-size analyses were carried out by means of a laboratory air-jet screen, with a weighed portion of 3 g and an operating time of 3 minutes. The residual moisture content was 4 wt. %, based on the total weight.

The maximum grain size was decreased by a subsequent screening on an air-jet screen having a screening surface of 0.28 $m^2$ and a throughput of 10 kg/h, so that 100 wt. % of the finely divided solid, based on the total weight, passed through a 0.08 mm screen.

At various stages of the process (prior to the dissolving and soaking step, as gel, as powder, as various screened fractions of the powder), the viscosity of the methyl hydroxyethyl cellulose was measured in aqueous solution and found to be unaffected by the process.

A paste of another methyl hydroxyethyl cellulose (consisting of methyl hydroxyethyl cellulose having a methoxy group content of 21.4 to 26.1 percent and a hydroxyethyl group content of 5.9 to 9.8 per cent and a viscosity in 2% aqueous solution of 28,000 mPa·s at 20° C. and 2.55 l/s (Haake Rotovisko)), at a throughput of the feed material of 50 kg/h, a vapour inlet temperature of 200° C. and outlet temperature of 150° C., yielded a product of which more than 84 wt. %, based on the total weight, passed through a 0.1 mm screen and more than 47 wt. % passed through a 0.063 mm screen. The bulk density of the product was 0.47 kg per liter.

For comparison, the same methyl hydroxyethyl cellulose paste was pulverised and dried in an atmosphere of nitrogen. About 100 operating cubic meters of nitrogen was circulated round the pulverising equipment. Under otherwise identical conditions, the temperature of the gas discharged fell to 130° C. A product was obtained of which only 56 wt. %, based on the total weight, passed through a 0.1 mm screen and only 17 wt. % passed through a 0.063 mm screen. The bulk density was 0.43 kg/liter.

The present invention has been described with referecne to specific details of particular embodiments thereof. It is not intended that such details be regarded as limitations upon the scope of the invention except insofar as and to the extent that they are included in the accompanying claims.

What is claimed is:

1. A finely divided polysaccharide derivative product prepared by a process comprising:

a) forming an aqueous composition comprising a polysaccharide derivative and water, said composition containing water in an amount of 35 to 99 wt. %, based on the total weight of said aqueous composition, said polysaccharide derivative being soaked or dissolved in said composition;

b) converting the polysaccharide derivative of said aqueous composition into finely divided solid particles by,
(i) contacting said aqueous composition with superheated water vapor in a dryer-pulverizer, thereby converting the water of said aqueous composition into the vapor phase, and converting the polysaccharide derivative of said aqueous composition into finely divided solid particles; or
(ii) causing the polysaccharide derivative of said aqueous composition to flocculate, thereby converting the polysaccharide derivative of said aqueous composition into finely divided solid particles; and c) optionally drying the finely divided solid particles of step b), wherein the primary structures which result from the polysaccharide starting material have been largely removed, and the product has a shape factor of less than 5 and greater than or equal to 1.

2. The polysaccharide derivative product of claim 1, wherein it is a cellulose derivative product.

3. The polysaccharide derivative product of claim 1, wherein it is a methyl cellulose product, methyl hydroxyethyl cellulose product, methyl hydroxypropyl cellulose product or hydroxypropyl cellulose product.

4. The polysaccharide derivative product of claim 2 wherein the polysaccharide product is a cellulose ether product.

* * * * *